United States Patent
Diab

(10) Patent No.: US 8,340,010 B2
(45) Date of Patent: Dec. 25, 2012

(54) METHOD AND SYSTEM FOR ENERGY EFFICIENT SYNCHRONIZATION IN PACKET BASED NETWORKS

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 443 days.

(21) Appl. No.: 12/690,877

(22) Filed: Jan. 20, 2010

(65) Prior Publication Data

US 2011/0142080 A1    Jun. 16, 2011

Related U.S. Application Data

(60) Provisional application No. 61/287,123, filed on Dec. 16, 2009.

(51) Int. Cl.
*H04W 52/02* (2009.01)
(52) U.S. Cl. ........................................................ 370/311
(58) Field of Classification Search ................... 370/311
See application file for complete search history.

(56) References Cited

U.S. PATENT DOCUMENTS

| | | | |
|---|---|---|---|
| 5,560,021 A * | 9/1996 | Vook et al. | 713/323 |
| 6,795,450 B1 | 9/2004 | Mills et al. | |
| 2003/0226050 A1 | 12/2003 | Yik et al. | |
| 2005/0188232 A1 | 8/2005 | Weng et al. | |
| 2006/0187866 A1 * | 8/2006 | Werb et al. | 370/311 |
| 2010/0128738 A1 | 5/2010 | Barrass | |

* cited by examiner

*Primary Examiner* — Melvin Marcelo
(74) *Attorney, Agent, or Firm* — Duane S. Kobayashi

(57) ABSTRACT

Aspects of a method and system for energy efficiency synchronization packet based networks are provided. In this regard, an amount that a clock of a network device drifts between consecutive communications of one or more synchronization packets may be determined, and transitions of the network device into and/or out-of an energy-saving mode of operation may be controlled based on the determination. Additionally or alternatively, the transitions may be controlled based on a number of times that synchronization packets are communicated between the network device and a link partner. An average difference between the clock of the network device and a reference clock may be calculated, and the transitions may be controlled based on the calculated average.

18 Claims, 4 Drawing Sheets

US 8,340,010 B2

METHOD AND SYSTEM FOR ENERGY EFFICIENT SYNCHRONIZATION IN PACKET BASED NETWORKS

CROSS-REFERENCE TO RELATED APPLICATIONS/INCORPORATION BY REFERENCE

This patent application makes reference to, claims priority to and claims benefit from U.S. Provisional Patent Application Ser. No. 61/287,123 filed on Dec. 16, 2009.

The above stated application is hereby incorporated herein by reference in its entirety.

FIELD OF THE INVENTION

Certain embodiments of the invention relate to networking. More specifically, certain embodiments of the invention relate to a method and system for energy efficiency synchronization packet based networks.

BACKGROUND OF THE INVENTION

Packet based communications networks, such as Ethernet, are becoming an increasingly popular means of communicating data of various types and sizes for a variety of applications. As an increasing number of devices are enabled for packet based communications, energy consumption of those devices may be a concern for a number of reasons. In this regard, the cost associated with powering and cooling networking devices is skyrocketing and constitutes a large portion of the overhead of many businesses. Also, power consumption is a concern for the increasing number of network devices that are battery powered, because maximizing battery life often correlates to increased productivity.

Another area of concern in modern packet based networks is the ability to support various functions that require accurate timing. In this regard, packet based networks are increasingly being utilized to carry traffic such as voice, and multimedia traffic that require accurate timing so as not to degrade user experience. Conventional timing methods for packet based networks are also directly at odds with the goal of making the networks more energy efficient.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for energy efficiency synchronization packet based networks, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for energy efficiency synchronization packet based networks. In various embodiments of the invention, an amount that a clock of a network device drifts between consecutive communications of one or more synchronization packets may be determined, and transitions of the network device into and/or out-of an energy-saving mode of operation may be controlled based on the determination. Additionally or alternatively, the transitions may be controlled based on a number of times that synchronization packets are communicated between the network device and a link partner. An average difference between the clock of the network device and a reference clock may be calculated, and the transitions may be controlled based on the calculated average.

A maximum number of consecutive communications that the network device may skip before a difference between the clock of the network device and a reference clock is above a threshold may be calculated, and the transitions may be controlled based on the calculated maximum number. The transitions may be controlled such that the network device does not continuously operate in the energy-saving mode for more than approximately N*T seconds, where N corresponds to the calculated maximum number, and T corresponds to an amount of time between consecutive communications.

A minimum number of consecutive communications that the network device must participate in to ensure that a difference between its clock and a reference clock is below a threshold may be calculated, and the transitions may be controlled based on the calculated minimum number. The transitions may be controlled such that the network device does not transition into the energy-saving mode sooner than approximately M*T seconds after transitioning out of the energy-saving mode, where M corresponds to the calculated minimum number, and T corresponds to an amount of time between consecutive communications of one or more synchronization packets.

While operating in the energy-saving mode, the network device may operate in one or both of a low power idle mode and a sub-rating mode. The communications of one or more synchronization packets may comprise one or both of: communicating packets comprising timestamps, and communicating packets comprising a bit pattern from which a clock may be recovered. Upon transitioning out of the energy-saving state and until the clock is resynchronized, the network device may generate and/or output an indication that the clock may have drifted by more than a particular amount.

Figure 1:
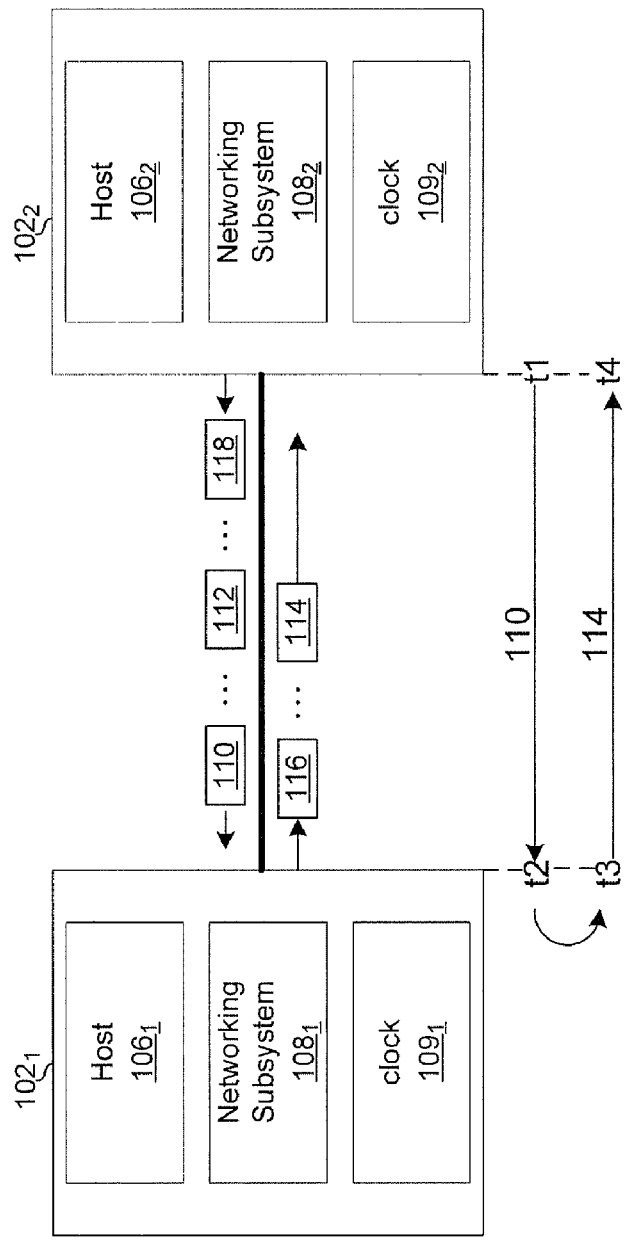
FIG. 1 is a diagram illustrating communication of synchronization packets between two network devices, in accordance with an embodiment of the invention.

FIG. 1 is a diagram illustrating communication of synchronization packets between two network devices, in accordance with an embodiment of the invention. Referring to FIG. 1A there is shown network devices $102_1$ and $102_2$, each referred to generically as $102_X$, communicating synchronization packets 106 over a network link 104. Each network device $102_X$ may comprise a host $106_X$, a networking subsystem $108_X$, and a clock $109_X$.

The link 104 is not limited to any specific medium. Exemplary link 104 media may comprise copper, wireless, optical and/or backplane technologies. For example, a copper medium such as STP, Cat3, Cat 5, Cat 5e, Cat 6, Cat 7 and/or Cat 7a as well as ISO nomenclature variants may be utilized. Additionally, copper media technologies such as InfiniBand, Ribbon, and backplane may be utilized. With regard to optical media for the link 104, single mode fiber as well as multi-mode fiber may be utilized. With regard to wireless, the network devices $102_1$ and $102_2$ may support one or more of the 802.11 family of protocols. In an exemplary embodiment of the invention, the link 104 may comprise up to four or more physical channels, each of which may, for example, comprise an unshielded twisted pair (UTP). The network devices $102_1$ and $102_2$ may communicate via two or more physical channels comprising the link 104. For example, Ethernet over twisted pair standards 10BASE-T and 100BASE-TX may utilize two pairs of UTP while Ethernet over twisted pair standards 1000BASE-T and 10GBASE-T may utilize four pairs of UTP.

The network device $102_X$ may comprise, for example, a switch, router, end point, computer system, audio/video (A/V) enabled equipment, or a combination thereof. Additionally, the network device $102_X$ may be enabled to utilize Audio/Video Bridging and/or Audio/video bridging extensions (collectively referred to herein as audio video bridging or AVB) for the communication of multimedia content and associated control and/or auxiliary data. Also, the network device $102_X$ may be operable to implement security protocols such IPsec and/or MACSec.

The host $106_X$ may be operable to handle functionality of OSI layer 3 and above in the network devices 102 and 104, respectively. The host $106_X$ may be operable to perform system control and management, and may comprise hardware, software, or a combination thereof. The host $106_X$ may communicate with the networking subsystems $108_X$ via, for example, a PCI or other similar or suitable interface.

The networking subsystem $108_X$ may comprise suitable logic, circuitry, and/or code that may be operable to handle functionality of OSI layer 1 and above layers in the network device 102 and 104, respectively. In this regard, each networking subsystem $108_X$ may comprise, for example, a media access controller (MAC) and a PHY that communicate via a an MII, RMII, GMII, RGMII, SGMII, XGMII, XAUI, XFI, or similar interface. The networking subsystem $108_X$ may be operable to implement switching, routing, and/or network interface card (NIC) functions. The networking subsystem $108_X$ may be operable to implement Ethernet protocols, such as those based on the IEEE 802.3 standard, for example, but is not limited in this regard.

The network subsystem $108_X$ may comprise a twisted pair PHY capable of operating at one or more standard rates such as 10 Mbps, 100 Mbps, 1 Gbps, and 10 Gbps (10BASE-T, 100GBASE-TX, 1GBASE-T, and/or 10GBASE-T); potentially standardized rates such as 40 Gbps and 100 Gbps; and/or non-standard rates such as 2.5 Gbps and 5 Gbps. The network subsystem $108_X$ may comprise a backplane PHY capable of operating at one or more standard rates such as 10 Gbps (10GBASE-KX4 and/or 10GBASE-KR); and/or non-standard rates such as 2.5 Gbps and 5 Gbps. The network subsystem $108_X$ may comprise an optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY. The network subsystem $108_X$ may support multi-lane topologies such as 40 Gbps CR4, ER4, KR4; 100 Gbps CR10, SR10 and/or 10 Gbps LX4 and CX4. Also, serial electrical and copper single channel technologies such as KX, KR, SR, LR, LRM, SX, LX, CX, BX10, LX10 may be supported. Non-standard speeds and non-standard technologies, for example, single channel, two channel or four channels may also be supported. Moreover, TDM technologies such as PON at various speeds may be supported by the PHY devices 110.

Also, the network subsystem $108_X$ may support transmission and/or reception at a high(er) data in one direction and transmission and/or reception at a low(er) data rate in the other direction. For example, the network device $102_X$ may comprise a multimedia server and a link partner of the network device $102_X$ may comprise a multimedia client. In this regard, the network device $102_X$ may transmit multimedia data, for example, to the link partner at high(er) data rates while the link partner may transmit control or auxiliary data associated with the multimedia content at low(er) data rates. The network device $102_X$ may also support wireless protocols such as the IEEE 802.11 family of standards.

In various embodiments of the invention the network subsystem $108_X$ may be operable to implement one or more energy efficient features, which may be referred to as energy efficient networking (EEN), or in the specific case of Ethernet, energy efficient Ethernet (EEE). For example, a PHY of the network subsystem $108_X$ may be operable to support low power idle (LPI) and/or subset PHY, also referred to as sub-rating, techniques. LPI may generally refer a family of techniques where, instead of transmitting conventional IDLE symbols during periods of inactivity, a PHY of the network subsystem $108_X$ may remain silent and/or communicate signals other than conventional IDLE symbols. Sub-rating, or sub-set PHY, may generally refer to a family of techniques where a PHYs is reconfigurable, in real-time or near real-time, to communicate at different data rates and, in particular, at lower data rates while operating in an energy-saving mode. In some embodiments of the invention, both LPI modes of operation and Sub-rating modes of operation may be utilized. In this regard, a network device may not be operable to receive or process synchronization packets while in an LPI mode but may be operable to receive or process synchronization packets while in a sub-rating mode of operation. That is, a network device may transition out of an LPI mode to a sub-rating mode in order to re-synchronize, rather than having to transition out of the LPI mode to a fully functional or full-power mode of operation in which the device is operable to handle a maximum data rate. In this manner, performance may be enhanced in LPI devices, by improving synchronization, while still reducing energy consumption.

The clock $109_X$ may comprise suitable logic, circuitry, interfaces, and/or code that may be operable to generate periodic signals and/or track time with respect to a reference. In this regard, the clock $109_X$ may comprise one or more oscillators and/or may comprise a time-of-day clock. In various embodiments of the invention, the clock $109_X$ may be utilized to determine when to transmit, receive, or otherwise process data.

In operation, synchronization request (SREQ) packets, TIME packets, and RESPONSE packets may be communicated between the network devices $102_1$ and $102_2$. Timestamps may be generated at time instants corresponding to reception and transmission of the SREQ packets and RESPONSE packets. In the embodiment of the invention depicted in FIG. 2A, the clock $109_2$ the master or reference clock. In this regard, selection of a master clock may be random, configured by an administrator, and/or based on any other factors and/or algorithms.

At time instant t1 the network device $102_2$ may be operable to transmit SREQ packets 110 via the link 104. Upon transmission of the SREQ packet 110, the network device $102_2$ may generate timestamp TS1 corresponding to time instant t1. Shortly after time instant t1, network device $102_2$ may transmit a TIME packet 112 containing TS1 via the link 104.

At time instant t2, the SREQ packets 110 may be received by the network device $102_1$ and the network device $102_1$ may generate a corresponding timestamp TS2. Shortly after time instant t2, the network device $102_1$ may receive TP1. Additionally, the network device $102_1$ may generate a RESPONSE packet 114 to be communicated back to the network device $102_2$.

At time instant t3, the network device $102_1$ may transmit the RESPONSE packet 114 via the link 104. Upon transmission of the RESPONSE packet 114, the network device $102_1$ may generate a timestamp TS3, corresponding to time instant t3. Shortly after time instant t3, the network device $102_1$ may transmit the TIME packet 116 containing timestamp TS3 via the link 104.

At time instant t4, the RESPONSE packet 114 may be received by the network device $102_2$ and the network device $102_2$ may generate a corresponding timestamp TS4. Shortly after time instant t4, the network device $102_2$ may receive the TIME packet 116. Shortly after time instant t4, the network device $102_2$ may also generate and transmit a TIME packet 118 comprising timestamp TS4 to the network device $102_1$.

Upon receiving TIME packet 118, the network device $102_1$ may know t1, t2, t3, and t4 and may solve for the offset, $\Delta$, between its clock $109_1$ and the clock $109_2$ in the network device $102_2$ utilizing EQs. 1 and 2:

$$t2-t1=PD+\Delta \qquad \text{EQ. 1}$$

$$t4-t3=PD+\Delta \qquad \text{EQ. 2}$$

where PD is the propagation delay of the link 104, which is assumed to be the same in both directions. Accordingly, the network device $102_1$ may adjust its clock $109_1$ by $\Delta$ to synchronize it to the master clock $109_2$.

Such communication of SREQ, TIME, and RESPONSE packets may occur periodically and the value of $\Delta$ for each communication may be stored for each communication. After a plurality of values of $\Delta$ have been received, the network device $102_1$ may be operable to calculate an average value of $\Delta$, denoted $\Delta_{AVG}$. Accordingly, $\Delta_{AVG}$ may be updated based on values of $\Delta$. In various embodiments of the invention, once $\Delta_{AVG}$ becomes sufficiently stable, such that each successive value of $\Delta$ has little impact on $\Delta_{AVG}$, the network device $102_1$ may be operable to take a break from engaging in communications of synchronization packets and may, consequently, be enabled to go into a energy-saving state. In this regard, transition into the energy-saving state may depend on a variety of factors and/or an EEN control policy of the networking device $102_1$.

It should be noted that FIG. 1 illustrates only one exemplary method for synchronizing network devices via a communication of packets and aspects of the invention are not so limited. In this regard, any method of synchronization that utilizes a communication of packets to calculate a difference between two clocks may utilize aspects of the present invention. IEEE 1588, IEEE 802.1AS, and Synchronous Ethernet (SyncE) are three examples of such methods.

For a synchronization method such as SyncE, for example, a clock may be recovered from, or received with, a received packet. For example, the packets may comprise a known or predetermined bit pattern that may be utilized to recover the clock. Accordingly, when utilizing a synchronization method such as this, any received packet from which a clock can be recovered may effectively be a synchronization packet. For example, network device $102_2$ may send packets to network device $102_1$ and the network device $102_1$ may recover a clock from the packets and utilize the recovered clock to synchronize clock $109_1$ to clock $109_2$. Accordingly, $\Delta$ may be calculated for each received packet and, after a plurality of values of $\Delta$ have been calculated, the network device $102_1$ may be operable to calculate an average value of $\Delta$, denoted $\Delta_{AVG}$. In this regard, $\Delta_{AVG}$ may be updated periodically or aperiodically based on values of $\Delta$.

In some embodiments of the invention, D and $D_{AVE}$ may be calculated in terms of fractions of a second. In some embodiments of the invention, D and $D_{AVG}$ may be calculated in terms of phase (degrees or radians).

Figure 2:
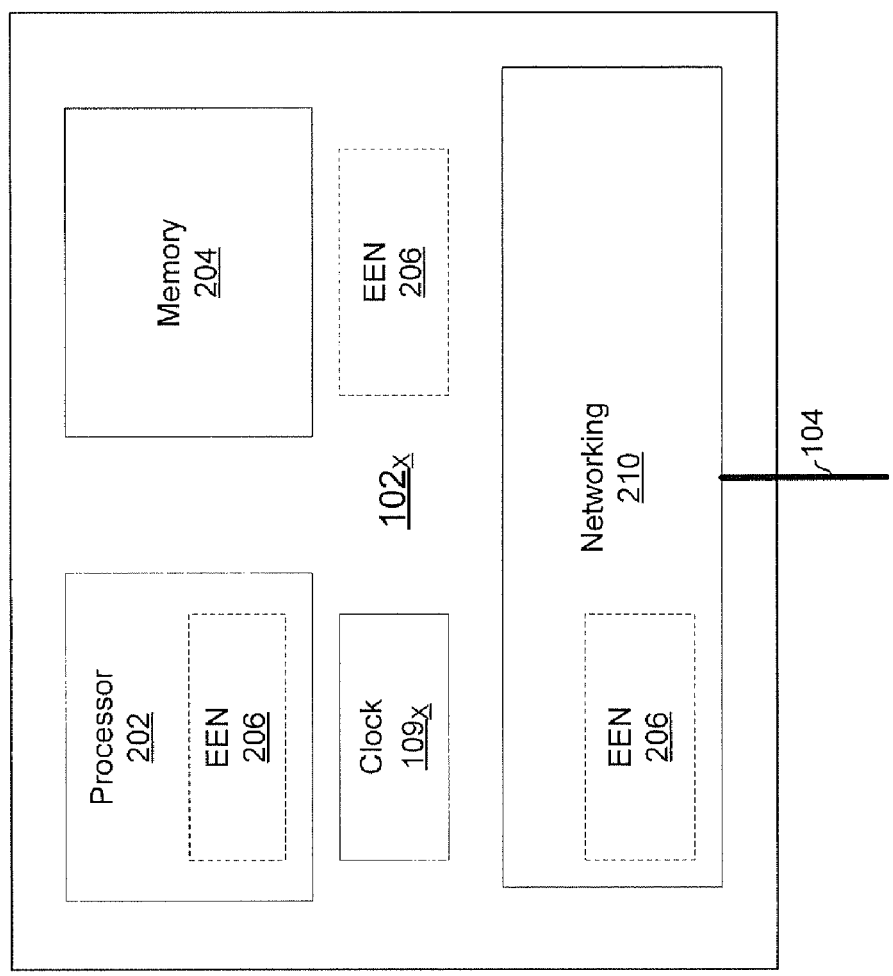
FIG. 2 is a block diagram illustrating an exemplary network device, accordance with an embodiment of the invention.

FIG. 2 is a block diagram illustrating an exemplary network device, in accordance with an embodiment of the invention. Referring to FIG. 2, there is shown a network device $102_X$ comprising a processor 202, memory 204, a clock 212, and networking subsystem 210. The clock $109_X$ may be as described with respect to FIG. 1.

The processor 202 may comprise suitable logic, circuitry, interfaces, and/or code that may be operable to process data, generate signals, and/or control operation of the network device $102_X$. Furthermore, the processor 202 may be operable to implement an EEN control policy.

The memory 204 may comprise, for example, RAM, ROM, NVRAM, or flash. The memory 204 may, for example, store instructions that may be executed by the processor 202, parameter values, calculation data, EEN state information, and/or received and/or to-be-transmitted data.

The EEN module 206 may comprise suitable logic, circuitry, interfaces, and/or code that may be operable to control buffering of received and/or to-be-transmitted data, control various operations/functions of the network device $102_X$, and/or otherwise process information and generate signals to implement an EEN control policy. In this regard, the EEN module 206 may be operable to generate control signals for configuring the networking subsystem 210 for implementing EEN features such as LPI or sub-rating. The EEN module 206 may additionally, or alternatively, be operable to generate, or control generation of, messages for managing and coordinating implementation of EEN features. In this regard, transitioning from one mode of operation to another may require acceptance, cooperation, or at least awareness by a link partner such that communications are not corrupted. In various embodiments of the invention, the EEN module 206 may be implemented, as indicated by the dashed lines, by the processor 202, in dedicated hardware in the networking device $102_X$, in the networking subsystem 210, and/or in a combination thereof.

In operation, the network device $102_X$ may be operable to synchronize its clock $109_X$ to a reference clock residing in a link partner of the network device $102_X$. In this regard, packets, such as packets 110-118, may be generated by the processor 202 and/or the networking subsystem 210 and may be communicated over the link 104. The networking subsystem 210 and/or the processor 202 may be operable to utilize the clock $109_X$ to generate timestamps corresponding to time instants at which packets are transmitted and/or received. Received and/or to-be-transmitted packets and/or associated timestamps may be stored in the memory 204. The processor 202 and/or the networking subsystem 210 may be operable to calculate the difference, $\Delta$, between the clock $109_X$ and the reference clock and may be operable to calculate the average value of $\Delta$ over time. The calculated values $\Delta$ and/or $\Delta_{AVG}$ may be stored in the memory 204 and/or may be stored in memory or registers within the networking subsystem 210.

In various embodiments of the invention, an initial plurality of communications of one or more synchronization packets may occur to synchronize the clock $109_X$. The communications may occur periodically and may be separated by a time interval of T seconds, where T is any number greater than 0. The number, K, of initial communications during this initial synchronization may be determined based on, for example, the stability of the clock $109_X$ and other variances in the network devices $102_1$, $102_2$ and/or on the link 104.

After K communications of one or more synchronization packets, the network device $102_X$ may be enabled to enter an energy efficient mode if other conditions—determined by the EEN control policy—so dictate. While operating in the energy-saving mode, the network device $102_X$ may not engage in communications of one or more synchronization packets. Consequently, the clock $109_X$ may be begin to drift and may be no longer synchronized to the reference clock. Accordingly, aspects of the invention may enable the network device $102_X$ to remain in an energy-saving mode as long as the difference between the clock $109_X$ and the reference clock is less than a maximum value, $\Delta_{MAX}$. In this regard, if the clock $109_X$ drifts an amount ($\Delta_{MAX}/N$) per T seconds, then the network device $102_X$ may remain in the energy-saving mode for up to N*T seconds. However, the networking device $102_X$ may transition out of the energy-saving state sooner if other conditions and/or events so dictate—as determined by the EEN control policy.

In various embodiments of the invention, the network device $102_X$ may be operable to estimate the drift per time interval T based on the calculated values of $\Delta$ and/or $\Delta_{AVG}$. Accordingly, the network device may be operable to calculate N based on its estimate of drift per time interval T. In other embodiments of the invention, N may be predetermined based, for example, on experimental and/or empirical data.

In one embodiment of the invention, the network device $102_X$ may track time during which it is in an energy-saving mode via a counter. In another embodiment of the invention, the network device $102_X$ may keep a minimal amount of logic, circuitry, and/or code active to enable detection of and counting of synchronization packets on the link 104. In this regard, the network device $102_X$ may be operable to: ignore the first N–1 synchronization packets received after transitioning into an energy-saving state; transition out of the energy-saving mode upon receiving the Nth synchronization packet after transitioning into the energy-saving mode; and calculate a value of $\Delta$ based on the $(N+1)^{th}$ synchronization packet received after entering the energy efficient mode.

After sleeping for N*T seconds, the network device $102_X$ may engage in M communications of one or more synchronization packets in order to resynchronize the clock $109_X$ with the reference clock. Accordingly, after M communications, the network device $102_X$ may, if so dictated by the EEN control policy, transition back into an energy-saving mode of operation for up to N*T seconds and the process may repeat. In this manner, energy efficiency in the network device $102_X$ may be improved by operating the network device $109_X$ in an energy-saving mode up to (N/M*100) percent of time.

In some instances, it may be possible that the device $102_X$ may transition out of an energy-saving mode but there may be no synchronization packets communicated for re-synchronizing the clock $109_X$. This may occur, for example, if a link partner has not yet come out of an energy saving mode. In such instances, the device $109_X$ may continue to use the clock $109_X$. While operating without re-synchronizing, the network device $102_X$ may set a flag and/or generate an indication that the clock $109_X$ may have drifted by more than a particular and/or tolerated amount. While operating without re-synchronizing, the network device $102_X$ may occasionally attempt to establish communications with a link partner in order to re-synchronize the clock $109_X$.

Figure 3:
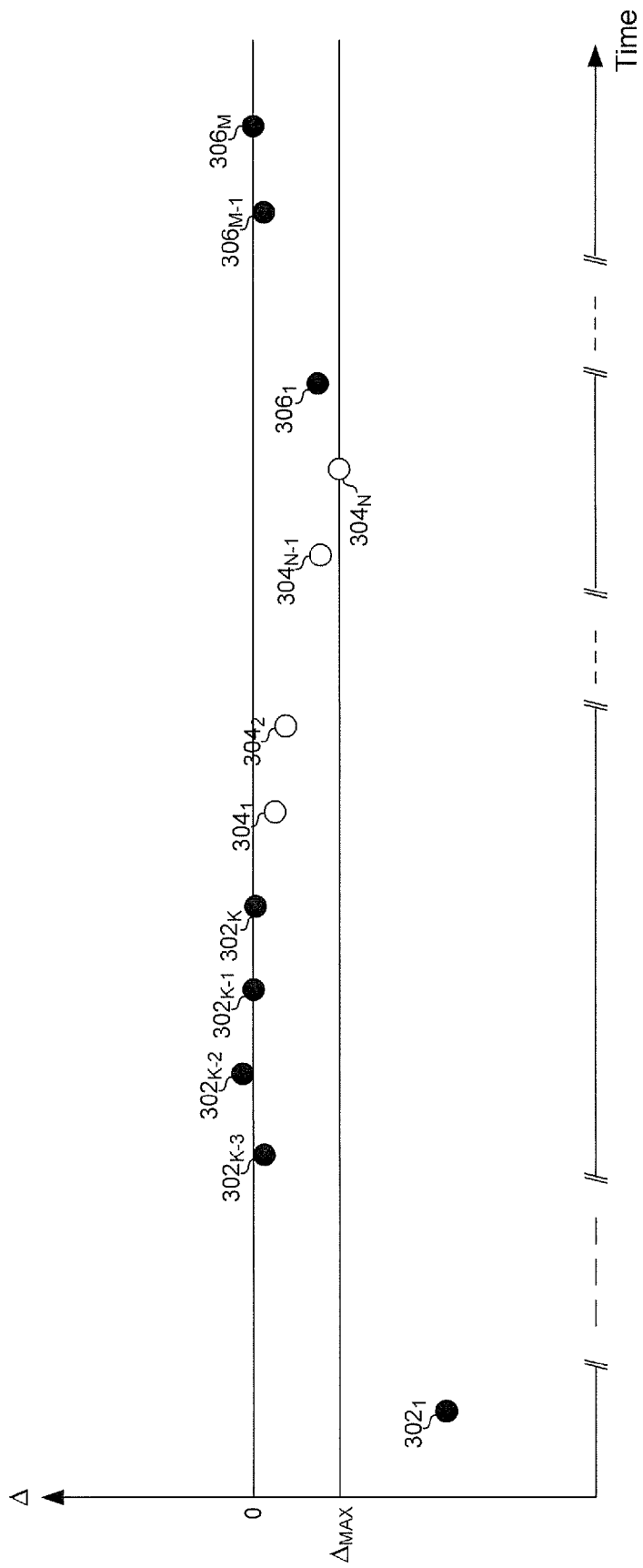
FIG. 3 is a diagram illustrating energy efficient synchronization of a network device, in accordance with an embodiment of the invention.

FIG. 3 is a diagram illustrating energy efficient synchronization of a network device, in accordance with an embodiment of the invention. Referring to FIG. 3 there is shown $\Delta$ values $302_1$-$302_K$ corresponding to an initial synchronization of the clock $109_X$, theoretical or estimated $\Delta$ values $304_1$-$304_N$ corresponding to the drifting of the clock $109_X$ while the network device $102_X$ operates in an energy efficient mode, and D values $306_1$-$306_M$ corresponding to a resynchronization of the clock $109_X$ after transitioning out of an energy-saving mode. That is, the values $302_1$-$302_K$ and $306_1$-$306_M$ correspond to communications of one or more synchronization packets that the network device $102_X$ participates in, whereas the estimate values $304_1$-$304_N$ correspond to communications of one or more synchronization packets that the network device $102_X$ skips or ignores. In this regard, various synchronization protocols may dictate that the communications occur periodically, but the network device $102_X$ may skip or ignore scheduled communications when operating in an energy-saving mode.

Figure 4:
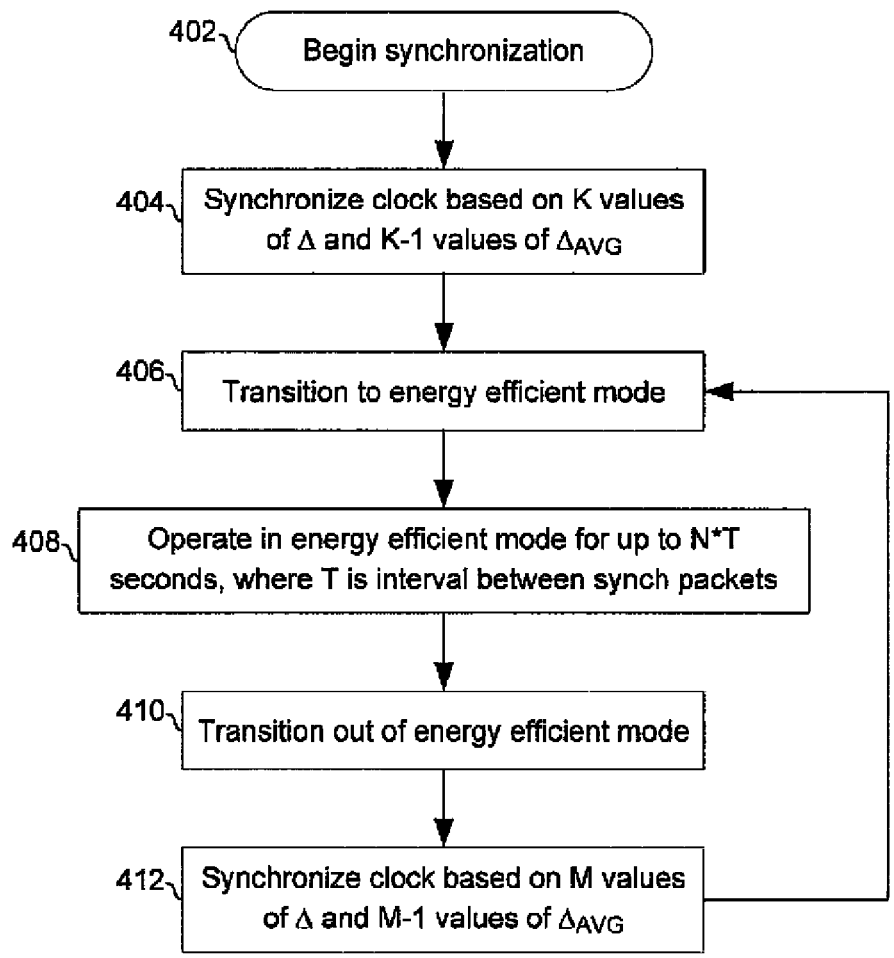
FIG. 4 is a flow chart illustrating exemplary steps for energy efficient synchronization, in accordance with an embodiment of the invention.

FIG. 4 is a flow chart illustrating exemplary steps for energy efficient synchronization, in accordance with an embodiment of the invention. Referring to FIG. 4, the exemplary steps may begin with step 402 in which a network device $102_X$ may be configured to synchronize a clock within the network device $102_X$ to a clock of one of its link partners. Subsequent to step 402, the exemplary steps may proceed to step 404. In step 404, K communications of one or more synchronization packets, such as the set of synchronization packets 110-118 described with respect to FIG. 1, may occur between the network device $102_X$ and its link partner. Accordingly, the network device $102_X$ may calculate a corresponding K values of $\Delta$ ($\Delta$ being the difference between the two clocks), and K–1 values of $\Delta_{AVG}$ ($\Delta_{AVG}$ being the average value of $\Delta$). After synchronizing the clocks in step 404, the exemplary steps may be enabled to transition to an energy-saving mode—if such a transition is determined appropriate by the EEN control policy. In this regard, the EEN control policy may control transitions between modes of operation based on a variety of conditions, events, and/or other factors.

Assuming, for illustration, that transitioning to an energy-saving mode is appropriate, then subsequent to step 404, the exemplary steps may advance to step 406. In step 406, one or more portions of the networking device $109_X$ may be powered down and/or operated more slowly. In this regard, the energy-saving mode may comprise the network device $109_X$ operating in a LPI and/or sub-rating mode. Subsequent to step 406, the exemplary steps may advance to step 408.

In step 408, the networking device $102_X$ may operate in the energy-saving mode. The network device $109_X$ may stay in the energy-saving mode until the EEN control policy dictates a transition out of the energy-saving mode or until the energy-saving device has been in the energy-saving mode for N*T seconds, where N is an integer and T is a time interval between communications of one or more synchronization packets. In this regard, because the clock $109_X$ may not be resynchronized with the reference clock while in the energy-saving mode, N*T seconds may correspond to an amount of time where the clock $109_X$ has not drifted beyond a particular and/or tolerable amount. Subsequent to step 408, the exemplary steps may advance to step 410.

In step 410, the networking device $102_X$ may transition out of an energy-saving mode. In this regard, one or more portions of the network device $102_X$ may be powered up and/or sped up. For example, the networking device $102_X$ may transition from communicating over only a subset of channels of the link 104 to communicating over all channels of the link 104. Subsequent to step 410, the exemplary steps may advance to step 412.

In step 412, the network device $102_X$ may resynchronize the clock $109_X$ to the clock of one of its link partners. In this regard, the network device $102_X$ may engage in M packet communications and calculate M corresponding values of $\Delta$ and M–1 values of $\Delta_{AVG}$. After synchronizing the clocks in step 412, the exemplary steps may be enabled to transition to an energy-saving mode, if such a transition is determined appropriate by the EEN control policy.

Certain embodiments of the invention may be found in a method and system for energy efficiency in synchronized packet based networks. In various embodiments of the invention, an amount that a clock $109_1$ of the network device $102_1$ drifts between consecutive communications may be determined and the transitions of the network device $102_1$ into and/or out-of the energy-saving mode of operation may be controlled based on the determination. Additionally or alternatively, the transitions may be controlled based on a number of communications of synchronization packets 110-118 between the network device $102_1$ and a link partner $102_2$. An average difference between the clock $109_1$ of the network device $102_1$ and the reference clock $109_2$ may be calculated, and the transitions may be controlled based on the calculated average.

A maximum number, N, of consecutive communications of one or more synchronization packets that the network device $102_1$ may skip before a difference between the clock $109_1$ of the network device $102_1$ and a reference clock $102_2$ is above a threshold may be calculated, and the transitions may be calculated based on the calculated maximum number. The transitions may be controlled such that the network device $102_1$ does not continuously operate in the energy-saving mode for more than approximately N*T seconds, where T corresponds to an amount of time between consecutive communications of one or more synchronization packets.

A minimum number, M, of consecutive communications of one or more synchronization packets that the network device $102_1$ must participate in to ensure that a difference between its clock $109_1$ and a reference clock $109_2$ is below a threshold may be calculated, and the transitions may be controlled based on the calculated minimum number. The transitions may be controlled such that the network device does not transition into the energy-saving mode sooner than approximately M*T seconds after transitioning out of the energy-saving mode, where T corresponds to an amount of time between consecutive communications.

While operating in the energy-saving mode, the network device $102_1$ may operate in one or both of a low power idle mode and a sub-rating mode. The communications of one or more synchronization packets may comprise one or both of: communicating packets comprising timestamps, such as packets 110-118, and communicating packets comprising a bit pattern from which a clock may be recovered. Upon transitioning out of the energy-saving state and until the clock is resynchronized, the network device $102_1$ may generate and/or output an indication that the clock $109_1$ may have drifted by more than a particular amount.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for energy efficiency synchronization packet based networks.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
   performing by one or more circuits and/or processors in a network device:
   determining an amount that a clock of said network device drifts during a time period between communications of one or more synchronization packets, wherein said synchronization packets are communicated between said network device and a link partner to which said network device is communicatively coupled; and
   controlling transitions of said network device into and/or out-of an energy-saving mode of operation based on said determined amount, said controlling considering a total clock drift produced by multiple time periods between communications of one or more synchronization packets between said network device and said link partner.

2. The method according to claim 1, comprising:
   calculating a maximum number of consecutive ones of said communications of said one or more synchronization packets that said network device may skip before a difference between said clock of said network device and a reference clock is above a threshold; and
   controlling said transitions based on said calculated maximum number.

3. The method according to claim 2, comprising controlling said transitions such that said network device does not continuously operate in said energy-saving mode for more than approximately N*T seconds, where N corresponds to said calculated maximum number, and T corresponds to an amount of time between consecutive ones of said communications of said one or more synchronization packets.

4. The method according to claim 1, comprising:
  calculating a minimum number of consecutive ones of said communications of said one or more synchronization packets that said network device participates in to ensure that a difference between said clock of said network device and a reference clock is below a threshold; and
  controlling said transitions based on said calculated minimum number.

5. The method according to claim 4, comprising controlling said transitions such that said network device does not transition into said energy-saving mode sooner than approximately M*T seconds after transitioning out of said energy-saving mode, where M corresponds to said calculated minimum number, and T corresponds to an amount of time between consecutive ones of said communications.

6. The method according to claim 1, comprising:
  calculating an average difference between said clock of said network device and a reference clock; and
  controlling said transitions based on said calculated average.

7. The method according to claim 1, wherein, while operating in said energy-saving mode, said network device operates in one or both of a low power idle mode and a sub-rating mode.

8. The method according to claim 1, wherein said communications of one or more synchronization packets comprises one or both of:
  communicating packets comprising timestamps; and
  communicating packets comprising a bit pattern from which a clock may be recovered.

9. The method according to claim 1, comprising, upon transitioning out of said energy-saving mode and until said clock is resynchronized, generating an indication that said clock may have drifted by more than a particular amount.

10. A system for networking, the system comprising:
  one or more circuits and/or processors for use in a network device, wherein said one or more circuits and/or processors are operable to:
  determine an amount that a clock of said network device drifts during a time period, between communications of one or more synchronization packets, wherein said synchronization packets are communicated between said network device and a link partner to which said network device is communicatively coupled; and
  control transitions of said network device into and/or out-of an energy-saving mode of operation based on said determined amount, said controlling considering a total clock drift produced by multiple time periods between communications of one or more synchronization packets be said network device and said link partner.

11. The system according to claim 10, wherein said one or more circuits and/or processors are operable to:
  calculate a maximum number of consecutive ones of said communications of said one or more synchronization packets that said network device may skip before a difference between said clock of said network device and a reference clock is above a threshold; and
  control said transitions based on said calculated maximum number.

12. The system according to claim 11, wherein said one or more circuits and/or processors are operable to control said transitions such that said network device does not continuously operate in said energy-saving mode for more than approximately N*T seconds, where N corresponds to said calculated maximum number, and T corresponds to an amount of time between consecutive ones of said communications of said one or more synchronization packets.

13. The system according to claim 10, wherein said one or more circuits and/or processors are operable to:
  calculate a minimum number of consecutive ones of said communications of said one or more synchronization packets that said network device participates in to ensure that a difference between a clock of said network device and a reference clock is below a threshold; and
  control said transitions based on said calculated minimum number.

14. The system according to claim 13, wherein said one or more circuits and/or processors are operable to control said transitions such that said network device does not transition into said energy-saving mode sooner than approximately M*T seconds after transitioning out of said energy-saving mode, where M corresponds to said calculated minimum number, and T corresponds to an amount of time between consecutive ones of said communications.

15. The system according to claim 10, wherein said one or more circuits and/or processors are operable to calculate an average difference between said clock of said network device and a reference clock; and
  controlling said transitions based on said calculated average.

16. The system according to claim 10, wherein, while operating in said energy-saving mode, said network device operates in one or both of a low power idle mode and a sub-rating mode.

17. The system according to claim 10, wherein said communications of one or more synchronization packets comprises one or both of:
  communicating packets comprising timestamps; and
  communicating packets comprising a bit pattern from which a clock may be recovered.

18. The system according to claim 10, wherein said one or more circuits and/or processors are operable to, upon transitioning out of said energy-saving mode and until said clock is resynchronized, generate an indication that said clock may have drifted by more than a particular amount.

* * * * *